US011104158B2

United States Patent
Fujiwara et al.

(10) Patent No.: US 11,104,158 B2
(45) Date of Patent: Aug. 31, 2021

(54) PRINTING METHOD AND PRINTING DEVICE

(71) Applicant: RICOH COMPANY, LTD., Tokyo (JP)

(72) Inventors: Yukio Fujiwara, Kanagawa (JP); Yuuma Usui, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/928,054

(22) Filed: Jul. 14, 2020

(65) Prior Publication Data
US 2021/0016579 A1  Jan. 21, 2021

(30) Foreign Application Priority Data

Jul. 16, 2019 (JP) .............................. JP2019-130900
May 27, 2020 (JP) .............................. JP2020-092270

(51) Int. Cl.
*B41J 11/00* (2006.01)

(52) U.S. Cl.
CPC .................................. *B41J 11/002* (2013.01)

(58) Field of Classification Search
CPC ............... B41J 11/002; B29K 2105/00; B29C 35/0805; B29C 44/3415; B29C 44/022
See application file for complete search history.

(56) References Cited

U.S. PATENT DOCUMENTS

| 2003/0138617 A1 | 7/2003 | Courtoy et al. |
| 2013/0065024 A1 | 3/2013 | Aruga et al. |
| 2016/0075148 A1* | 3/2016 | Nakano ................ B41M 5/5209 347/102 |
| 2018/0320320 A1 | 11/2018 | Moriya et al. |

FOREIGN PATENT DOCUMENTS

| EP | 1 482 085 A1 | 12/2004 |
| EP | 3 335 897 A1 | 6/2018 |
| JP | 10-076587 | 3/1998 |
| JP | 2008-087244 | 4/2008 |
| JP | 2012-087451 | 5/2012 |
| JP | 2017-105162 | 6/2017 |

OTHER PUBLICATIONS

Extended European Search Report dated Jan. 13, 2021 in European Patent Application No. 20185861.0, 5 pages.

* cited by examiner

*Primary Examiner* — Bradley W Thies
(74) *Attorney, Agent, or Firm* — Grüneberg and Myers PLLC (57) ABSTRACT

A printing method includes applying a foaming agent composition containing a foaming agent to form a foaming agent layer, applying a foaming inhibitor composition containing a foaming inhibitor onto the foaming agent layer, curing the foaming agent layer with irradiation of active energy, and heating the foaming agent layer to foam the foaming agent layer, wherein the foaming agent composition has a viscosity of from 50 to 1,500 mPa·s at 25 degrees C. and the absolute difference between the static surface tension of the foaming agent composition and the static surface tension of the foaming inhibitor composition is 5 mN/m or less.

12 Claims, 5 Drawing Sheets

PRINTING METHOD AND PRINTING DEVICE

CROSS-REFERENCE TO RELATED APPLICATIONS

This patent application is based on and claims priority pursuant to 35 U.S.C. § 119 to Japanese Patent Application Nos. 2019-130900 and 2020-092270, filed on Jul. 16, 2019 and May 27, 2020, respectively, in the Japan Patent Office, the entire disclosures of which are hereby incorporated by reference herein.

BACKGROUND

Technical Field

The present disclosure relates to a printing method, a printing device, and printed matter.

Description of the Related Art

Materials such as flooring and wall paper on which images are printed by processes such as embossing are used for floors, interior walls, and ceilings of buildings.

One way to enhance the durability of such flooring and wall paper is to coat them with an ultraviolet curing material or electron beam curing material.

SUMMARY

According to embodiments of the present disclosure, a printing method is provided which includes applying a foaming agent composition containing a foaming agent to form a foaming agent layer, applying a foaming inhibitor composition containing a foaming inhibitor onto the foaming agent layer, curing the foaming agent layer with irradiation of active energy, and heating the foaming agent layer to foam the foaming agent layer, wherein the foaming agent composition has a viscosity of from 50 to 1,500 mPa·s at 25 degrees C. and the absolute difference between the static surface tension of the foaming agent composition and the static surface tension of the foaming inhibitor composition is 5 mN/m or less.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Inkjet methods are adopted to print such desired images on flooring and wall paper. A method of manufacturing a foamed wall paper containing an image forming layer, surface protection layer, and foaming agent layer that contains a thermoplastic resin and a foaming agent has been proposed in JP-5195999-B1 (JP-2011-87451-A1) in which the image forming layer and the surface protection layer are formed by curing or cross-linking upon exposure to electron beam radiation.

Another method has been proposed in JP-H10-76587-A1 by which materials are made designable by chemical embossing using an aqueous resin, and an unevenly designed surface pattern thus obtained is coated with ultraviolet coating to enhance anti-contamination and surface strength.

According to the present disclosure, a printing method is provided which provides durable printed matter having designing property and image quality due to excellent rough surface form.

Printing Method and Printing Device

The printing method of the present disclosure includes applying a foaming agent composition containing a foaming agent to form a foaming agent layer, applying a foaming inhibitor composition containing a foaming inhibitor onto the foaming agent layer, curing the foaming agent layer with active energy, and heating the foaming agent layer to inflate the volume thereof, wherein the foaming agent composition has a viscosity of from 50 to 1,500 mPa·s at 25 degrees C. and the absolute difference between the static surface tension of the foaming agent composition and the static surface tension of the foaming inhibitor composition is 5 mN/m or less. The printing method may furthermore optionally include other steps.

The printing device of the present disclosure includes a foaming agent layer forming device configured to apply a foaming agent composition containing a foaming agent to form a foaming agent layer, a foaming inhibitor composition applying device configured to apply a foaming inhibitor composition containing a foaming inhibitor to the foaming agent layer, a curing device configured to irradiate the foaming agent layer with active energy, and a foaming device configured to heat and foam the foaming agent layer, wherein the foaming agent composition has a viscosity of from 50 to 1,500 mPa·s at 25 degrees C. and the absolute difference between the static surface tension of the foaming agent composition and the static surface tension of the foaming inhibitor composition is 5 mN/m or less. The printing device may furthermore optionally include other devices.

The printing device of the present disclosure executes the printing method of the present disclosure. The foaming agent layer forming device executes the applying a foaming agent composition containing a foaming agent to form a foaming agent layer. The foaming inhibitor composition applying device executes the applying a foaming inhibitor composition containing a foaming inhibitor onto the foaming agent layer. The curing device executed the curing the foaming agent layer. The foaming device executes the heating the foaming agent layer to inflate the volume thereof. The other devices execute the other steps.

The technology disclosed in JP-5195999-B1 (JP-2011-87451-A1) fails to enhance designability and image quality relating to uneven surfaces by protecting printed matter with surface coating and imparting design only by foaming with a thermodecomposing foaming agent. Moreover, an excessively thin foaming agent layer cannot form an uneven foaming agent layer, which makes it impossible to create a design with excellent uneven surface form.

The technology disclosed in JP-H10-76587-A1 fails to enhance excellent durability and designability.

In contrast, the printing method and the printing device of the present disclosure can produce uneven surface forms and impart excellent designing property thereto, which will be described below.

Application of a foam inhibitor at desired portions in the foaming agent layer containing a foaming agent makes it possible to control the roughness of the uneven surface. The foaming inhibitor may contain a multi-functional monomer.

It is possible to obtain printed matter having a suitable roughness when such a foaming agent layer is formed thinly, which is achieved by patterning a foaming inhibitor containing a multi-functional monomer by an inkjet method using a robustly foaming thermoplastic polymer cell having a high foaming property in a foaming agent layer.

In the present disclosure, the foaming agent layer has robustness, durability and chemical resistance because active energy curing material is used which cures upon irradiation of active energy to the foaming agent layer.

Moreover, a rough pattern with a high designing property is formed irrespective of inhibiting area (discharging area), the reason of which is not clear. One possibility is that affinity between the foaming agent composition and the foaming inhibitor composition is enhanced by controlling the viscosity and static surface tension of the foaming agent composition and the foaming inhibitor composition applied to the foaming agent layer, which may lead to control of the permeation of the foaming inhibitor composition in the foaming agent layer.

Figure 1:
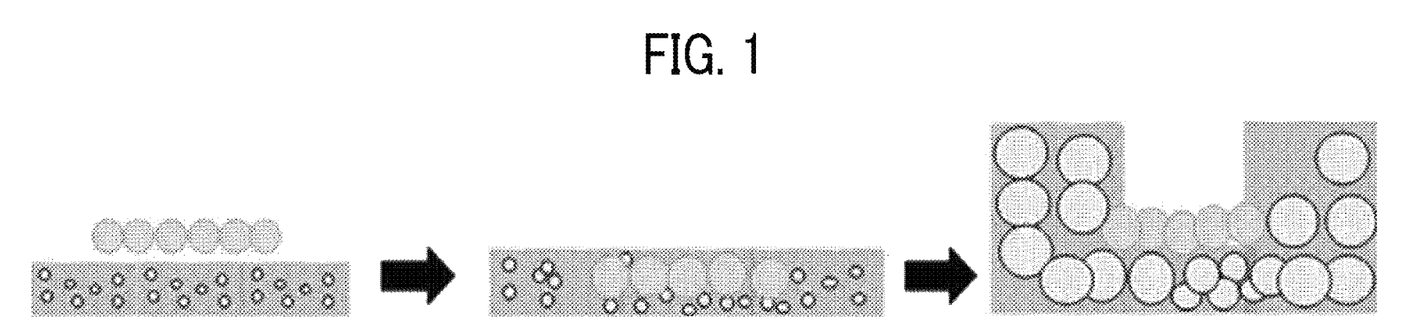
FIG. 1 is a diagram illustrating application of a foaming inhibitor composition to a foaming agent layer where the foaming agent composition minimally affiliates with the foaming inhibitor composition.

FIG. 1 is a diagram illustrating application of a foaming inhibitor composition to a foaming agent layer where the foaming agent composition minimally affiliates with the foaming inhibitor composition.

Figure 2:
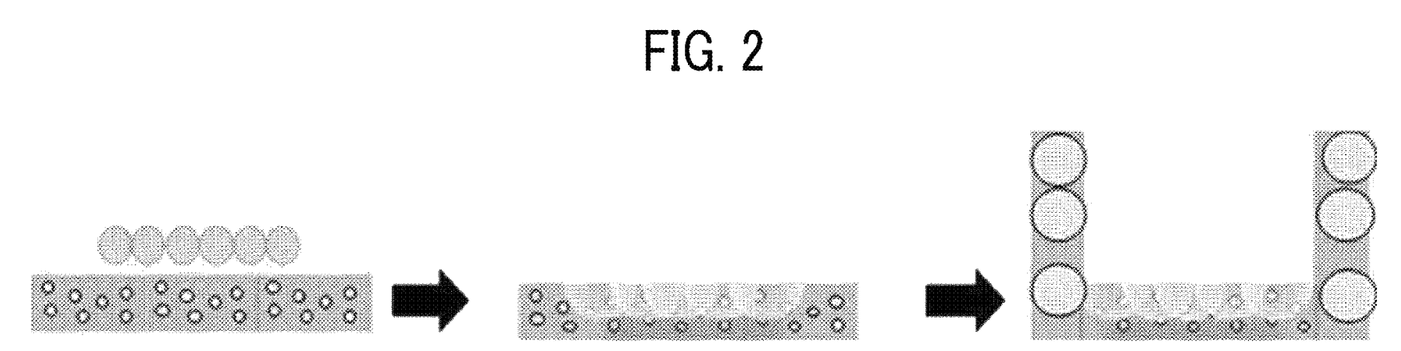
FIG. 2 is a diagram illustrating application of a foaming inhibitor composition to a foaming agent layer where the foaming agent composition affiliates with the foaming inhibitor composition.

FIG. 2 is a diagram illustrating application of a foaming inhibitor composition to a foaming agent layer where the foaming agent composition affiliates with the foaming inhibitor composition.

When the absolute difference of the static surface tension between the foaming agent composition and the foaming inhibitor composition surpasses 5 mN/m and the affinity therebetween is low, the foaming inhibitor composition interferes each other in the foaming agent layer, so the solid inhibitor is pushed away as illustrated in FIG. 1, which leads to unexpected foaming. This significantly occurs particularly when a foaming inhibitor composition is discharged at high dot density. As a result of the interference, the foaming inhibitor composition gathers near the surface so that the foaming agent layer is not prevented from foaming.

When the absolute difference of the static surface tension between the foaming agent composition and the foaming inhibitor composition is 5 mN/m or less and the affinity therebetween is high, the foaming inhibitor composition applied to the foaming agent layer diffuses and permeates to the inside thereof and around the foaming agent present in the deep inside of the foaming agent layer, which makes it possible to form various rough surfaces irrespective of the dot density of the foaming inhibitor composition as illustrated in FIG. 2.

Since the printing method of the present disclosure includes applying a foaming agent composition containing a foaming agent to form a foaming agent layer, applying a foaming inhibitor composition containing a foaming inhibitor onto the foaming agent layer, curing the foaming agent layer with irradiation of active energy, and heating the foaming agent layer to inflate the volume thereof, wherein the foaming agent composition has a viscosity of from 50 to 1,500 mPa·s at 25 degrees C. and the absolute difference between the static surface tension of the foaming agent composition and the static surface tension of the foaming inhibitor composition is 5 mN/m or less, the affinity between the foaming agent composition and the foaming inhibitor composition becomes high. Various rough surfaces can be formed irrespective of the dot density of the foaming inhibitor composition as a result, which makes it possible to achieve good designing property and image quality over a long period of time due to the formed excellent rough surface. Here, "excellent rough surface" refers to a surface having a clear height difference. If a surface has a less height difference or angles rounded at steps, the roughness obscure. The roughness can be clearly recognized in an excellent rough surface.

Moreover, a multi-functional monomer is preferable as the foaming inhibitor.

Because this multi-functional monomer cross-links three-dimensionally upon application of energy, it is possible to control foaming of the foaming agent layer by applying a multi-functional monomer to a portion not to be swollen in the foaming agent layer followed by curing the foaming agent layer with irradiation of active energy, which forms rough surfaces and imparts excellent designing property to printed matter.

In the present disclosure, the foaming agent composition has a viscosity at 25 degrees C. of from 50 to 1,500 mPa·s, more preferably from 100 to 1,000 mPa·s, and more preferably from 125 to 775 mPa·s.

When viscosity of the foaming agent composition at 25 degrees C. is from 50 to 1,500 mPa·s, it is advantageous to strike a balance among application stability of the foaming agent composition, uneven layer thickness after application, and control by the foaming inhibitor.

Viscosity of the foaming agent composition at 25 degrees C. can be measured by a cone plate type rotatory viscometer (VISCOMETER TVE-22L, manufactured by TOKI SANGYO CO., LTD.) using a cone rotor (1° 34'×R24) at a rate of rotation at 50 rpm and setting the temperature of hemathermal circulating water to 25 degrees C.

The static surface tension of the foaming agent composition is preferably from 27 to 35 mN/m.

The static surface tension of the foaming inhibitor composition is preferably from 27 to 40 mN/m.

The absolute difference between the static surface tension of the foaming agent composition and the static surface tension of the foaming inhibitor composition is 5 mN/m or less, preferably from 0 to 3 mN, and more preferably from 0 to 2.9 mN/m.

When the absolute difference between the static surface tension of the foaming agent composition and the static surface tension of the foaming inhibitor composition is 5 mN/m or less, the foaming inhibitor does not stay on the surface of the foaming agent composition but permeates the foaming agent composition, which is advantageous.

The static surface tension of the foaming inhibitor composition and the foaming agent composition can be measured by a method such as the plate method of an automatic surface tensiometer (DY-300, manufactured by Kyowa Interface Science, Inc.).

Foaming Agent Layer Forming and Foaming Agent Layer Forming Device

The foaming agent layer forming is to apply a foaming agent composition containing a foaming agent to form a foaming agent layer and executed by a foaming agent layer forming device.

The foaming agent composition containing a foaming agent is preferably applied to a substrate.

Substrate

The substrate is not particularly limited and can be suitably selected to suit to a particular application. Specific examples include, but are not limited to, plastic film, synthetic paper made of synthetic fiber, a non-woven fabric sheet, and building materials. Of these, durable substrates are preferable and building materials are more preferable.

The substrate is not particularly limited and can be suitably selected to suit to a particular application.

Specific examples include, but are not limited to, paper such as natural paper and synthetic paper, plastic film, unwoven fabric, cloth, wood, and thin metal film.

Specific examples of the plastic film include, but are not limited to, polyester film, polypropylene film, polyethylene film, plastic film made of materials such as nylon and vinylon, and acrylic film, and film attached to each other thereof.

The plastic film is not particularly limited and can be suitably selected to suit to a particular application. In terms of strength, mono- or biaxial oriented films are preferable.

The non-woven fabric is not particularly limited and can be suitably selected to suit to a particular application. An example is a sheet-like non-woven fabric made by spraying polyethylene fabric in a sheet-like form followed by heat pressing.

Specific examples of the building material include, but are not limited to, thermocuring resins, fiber boards, and particle board for use in floor material, wall paper, interior material, wall board material, base board material, ceiling material, and pillar, and items having a decorative laminate such as thermocuring resin, olefin, polyester, and PVC on the surface of the materials mentioned above.

The method of applying the foaming agent composition to the substrate is not particularly limited and can be suitably selected to suit to a particular application.

Specific examples include, but are not limited to, inkjet methods and application methods such as knife coating methods, nozzle coating methods, die coating methods, lip coating methods, comma coating methods, gravure coating methods, rotary screen coating methods, reverse roll coating methods, roll coating methods, spin coating methods, kneader coating methods, bar coating methods, blade coating methods, casting methods, dipping methods, and curtain coating methods.

The average thickness of the foaming agent layer is not particularly limited and can be suitably determined to a particular application. The average thickness is preferably 25 µm or more, more preferably 100 µm or more, furthermore preferably 250 µm or more, and particularly preferably from 300 to 500 µm.

When the average thickness is 100 µm or more, a foaming agent layer having a rough surface is formed, which imparts designing property attributable to an excellent rough surface form.

The average thickness of the foaming agent layer after foaming is not particularly limited and can be suitably determined to a particular application. The average thickness is preferably 100 µm or more, more preferably 310 µm or more, furthermore preferably 400 µm or more, and particularly preferably from 400 to 2,000 µm.

When the average thickness is 100 µm or more, a foaming agent layer having a rough surface attributable to the foaming inhibitor composition is formed, which imparts excellent designing property.

Foaming Agent Composition

The foaming agent composition contains a foaming agent, preferably an active energy curing material and a surface tension controlling agent, and optionally other components.

Foaming Agent

A chemical blowing agent is used as the foaming agent. Also, a foaming agent can be enclosed in a thermofoaming microcapsule. Of these, themoexpandable microcapsules are preferable because they have a high volume foaming ratio and form separate small uniform foams. The foaming agent is also referred to as foaming agent.

The thermofoaming microcapsule is a particle having a core-shell structure encapsulating a foaming agent in a thermoplastic resin. When the thermoplastic resin forming the outer shell starts softening by heating, the vapor pressure of the foaming agent encapsulated rises enough to expand and foam the thermoplastic resin as the outer shell. An example of the foaming agent composition is an aliphatic carbon hydrogen having a low boiling point.

Such thermofoaming microcapsule can be procured.

Specific examples include, but are not limited to, Advancell EM series (manufactured by SEKISUI CHEMICAL CO., LTD.), Expancell DU, WU, MB, SL, and FG series (manufactured by Akzo Nobel N. V.), Matsumoto Microsphere® F and FN series (manufactured by Matsumoto Yushi-Seiyaku Co., Ltd.), and KUREHA microsphere H750, H850, and H1100 (manufactured by KUREHA CORPORATION). These can be used alone or in combination.

The chemical blowing agent includes an organic foaming agent and inorganic foaming agent.

The organic foaming agent includes, but are not limited to, azodicarboxylic acid amide (ADCA), azobis isobutylynitrile (AIBN), p,p'-oxybis benzene sulphonyl hydrizide (OBSH), dinitrosopentamethylene tetramine (DPT), and zinc naphthenate. These can be used alone or in combination.

Specific examples of the inorganic foaming agent include, but are not limited to, hydrogen carbonate such as sodium hydrogen carbonate, carbonates, and combinations of hydrogen carbonate and an organic acid salt.

In addition, the proportion of the foaming agent is not particularly limited but can be suitably selected to suit to a particular application. It is preferably from 1 to 20 percent by mass and more preferably from 5 to 15 percent by mass in the total content of the foaming agent.

Active Energy Curing Material

The active energy curing material includes a mono-functional monomer and multi-functional monomer.

Mono-Functional Monomer

The mono-functional monomer has one vinyl, acryloyl, or methacryloyl group in the molecule.

The mono-functional monomer include, but are not limited to, γ-butyrolactone (meth)acrylate, isobornyl (meth)acrylate, formalized trimethylolpropane mono(meth)acrylate, trimethylolpropane (meth)acrylic acid benzoate, (meth)acryloylmorpholine, 2-hydroxypropyl(meth)acrylamide, N-vinylcaprolactam, N-vinylpyrrolidone, N-vinylformamide, cyclohexanedimethanol monovinyl ether, hydroxyethyl vinyl ether, diethylene glycol monovinyl ether, dicyclopentadiene vinyl ether, tricyclodecane vinyl ether, benzyl vinyl ether, ethyl oxetane methyl vinyl ether, hydroxybutyl vinyl ether, ethyl vinyl ether, ethoxy(4) nonylphenol (meth) acrylate, benzyl (meth)acrylate, and caprolactone (meth) acrylate. These can be used alone or in combination.

Of these, isobornyl (meth)acrylate is preferable because of its high glass transition temperature (Tg) and good fastness.

The proportion of the mono-functional monomer in the total mass of the foaming agent composition is preferably from 80 to 99.5 percent by mass and more preferably from 90 to 95 percent by mass.

Multi-Functional Monomer

The multi-functional monomer has two or more vinyl, acryloyl, or methacryloyl groups in the molecule.

Specific examples include, but are not limited to, ethylene glycol di(meth)acrylate, hydroxypivalic acid neopentyl glycol di(meth)acrylate, polytetramethylene glycol di(meth) acrylate, diethylene glycol di(meth)acrylate, triethylene glycol di(meth)acrylate, tetraethylene glycol di(meth)acrylate, polyethylene glycol dimethacrylate [$CH_2=CH-CO-(OC_2H_4)_n-OCOCH=CH_2$ (n≈9) (n nearly equal to 9), the same (n≈14), the same (n≈23)], dipropylene glycol di(meth) acrylate, tripropylene glycol di(meth)acrylate, polypropylene glycol dimethacrylate [$CH_2=C(CH_3)-CO-(OC_3H_6)_n-OCOC(CH_3)=CH_2 (n≈7)$], 1,3-butanediol di(meth)acrylate, 1,4-butanediol di(meth)acrylate, 1,6-hexanediol di(meth)acrylate, 1,9-nonanediol di(meth)acrylate, neopentyl glycol di(meth)acrylate, tricyclodecane dimethanol di(meth)acrylate, propylene oxide-modified bisphenol A di(meth)acrylate, polyethylene glycol di(meth)acrylate, dipentaerythritol hexa(meth)acrylate, propylene oxide-modified tetramethylolmethane tetra(meth)acrylate, dipentaerythritol hydroxy penta(meth)acrylate, caprolactone modified dipentaerythritol hydroxypenta(meth)acrylate, ditrimethylolpropane tetra(meth)acrylate, pentaerythritol tetra (meth)acrylate, trimethylolpropane tri(meth)acrylate, ethylene oxide modified trimethylolpropane tri(meth)acrylate, propylene oxide-modified trimethylol propane tri(meth) acrylate, caprolactone-modified trimethylol propane tri (meth)acrylate, pentaerythritol tri(meth)acrylate, tris(2-hydroxyethyl)isocyanurate tri(meth)acrylate, ethoxylated neopentyl glycol di(meth)acrylate, propylene oxide modified neopentyl glycol di(meth)acrylate, propylene oxide modified glyceryl tri(meth)acrylate, polyester di(meth)acrylate, polyester tri(meth)acrylate, polyester tetra(meth)acrylate, polyester penta(meth)acrylate, polyester poly(meth) acrylate, polyurethane di(meth)acrylate, polyurethane tri (meth)acrylate, polyurethane tetra(meth)acrylate, polyurethane penta(meth)acrylate, polyurethane poly(meth) acrylate, triethylene glycol divinyl ether, cyclohexanedimethanol divinyl ether, diethylene glycol divinyl ether, triethylene glycol divinyl ether, and ethoxylated(4)bisphenol di(meth)acrylate. These can be used alone or in combination.

The ratio of molecular weight to the number of functional monomers of the multi-functional monomer is preferably 250 or more to strike a balance between volume expansion and fastness.

The proportion of the multi-functional monomer in the foaming agent composition to the total amount of the polymerizable compound is 10 percent by mass or less and preferably 1 percent by mass or less. The proportion of the multi-functional monomer to the total content of the polymerizable compound is preferably 0.1 percent by mass or more and more preferably 0.5 percent by mass or more. When the proportion of the multi-functional monomer to the total content of the polymerizable compound is 10 percent by mass or less, it is advantageous to achieve good designing property (volume expansion) and fastness.

Polymerization Initiator

Examples of the polymerization initiator include, but are not limited to, thermal polymerization initiators and photopolymerization initiators. Of these, photopolymerization initiators are preferable in terms of designing property attributable to rough form and durability of the image quality.

The photopolymerization initiator produces active species such as a radical or a cation upon application of energy of an active energy ray and initiates polymerization of a polymerizable compound. As the polymerization initiator, it is suitable to use a known radical polymerization initiator, a cation polymerization initiator, a base producing agent, or a combination thereof. Of these, radical polymerization initiators are preferable.

The proportion of the polymerization initiator in the total mass of the foaming agent composition is preferably from 1 to 20 percent by mass and more preferably from 5 to 15 percent by mass to achieve a sufficient curing rate.

Specific examples of the radical polymerization initiators include, but are not limited to, aromatic ketones, acylphosphineoxide compounds, aromatic oniumchlorides, organic peroxides, thio compounds (e.g., thioxanthone compounds and compounds including thiophenyl groups), hexaarylbiimidazole compounds, ketoxime-esterified compounds, borate compounds, azinium compounds, metallocene compounds, active ester compounds, compounds having a carbon halogen bond, and alkylamine compounds.

In addition, a polymerization accelerator (sensitizer) can be optionally used together with the polymerization initiator.

The polymerization accelerator is not particularly limited and can be suitably selected to suit to a particular application.

Specific examples include, but are not limited to, amine compounds such as trimethyl amine, methyldimethanol amine, triethanol amine, p-diethylamino acetophenone, p-dimethylamino ethylbenzoate, p-dimethyl amino benzoate-2-ethylhexyl, N,N-dimthyl benzylamine, and 4,4'-bis (diethylamino)benzophenone.

The content of the polymerization accelerator is not particularly limited and suitably determined to suit to a particular application depending on the identification and the amount of the polymerization initiator.

Surface Tension Controlling Agent

The surface tension controlling agent is to control surface tension and not particularly limited as long as it is non-reactive to active energy and can be suitably selected to suit to a particular application. The surface tension controlling agent is procurable and specific examples include, but are not limited to, BYK-UV3510, BYK-3550, BYK-3990, and BYK 35600 (all manufactured by BYK-Chemie GmbH).

Other Components

The other components are not particularly limited and can be suitably selected to suit to a particular application. Examples include, but are not limited to, a filling agent, foaming accelerator, dispersant, coloring material, organic solvent, blocking inhibitor, thickening agent, preservative, stabilizer, deodorant, fluorescent agent, and ultraviolet blocking agent.

Filling Agent

Examples of the filling agent include, but are not limited to, aluminum hydroxide, magnesium hydroxide, barium hydroxide, calcium carbonate, magnesium carbonate, calcium sulfate, barium sulfate, ferrous hydroxide, basic zinc carbonate, basic lead carbonate, silica sand, clay, talc, silicas, titanium dioxide, and magnesium silicate. These can be used alone or in combination. Of these, calcium carbonate, magnesium carbonate, aluminum hydroxide, and magnesium hydroxide are preferable.

Foaming Accelerator

The foaming accelerator is not particularly limited and can be suitably selected to suit to a particular application.

Specific examples include, but are not limited to, zinc naphthenate, zinc acetate, zinc propionate, 2-ethyl zinc pentanoate, 2-ethyl-4-methyl zinc pentanoate, 2-methyl zinc hexanoate, 2-ethyl zinc hexanoate, zinc isooctylate, zinc n-octylate, zinc neodecanoate, zinc isodecanoate, zinc n-decanoate, zinc laurate, zinc myristate, zinc palmitate, zinc stearate, zinc isostearate, 12-hydroxy zinc stearate, zinc behenate, zinc oleate, zinc linoleate, zinc linoleate, zinc ricinoleate, zinc benzoate, zinc o-, m-, or p-toluate, p-t-butyl zinc benzoate, zinc salicylate, zinc phthalate, zinc salts of monoalkyl (C4-18) phthalic acid ester, zinc dehydroacetate, zinc dibutyldithiocarbamate, zinc aminocrotonate, zinc salts of 2-mercapto benzothiazole, zinc pyrithione, and zinc complex of urea or diphenylurea. These can be used alone or in combination.

Thickening Agent

Specific examples of the thickening agent include, but are not limited to polycyanoacrylate, polylactic acid, polyglycolic acid, poly caprolactone, polyacrylic acid alkyl esters, and polymethacrylic acid alkyl esters.

Preservative

The preservative includes, but is not limited to, a typically-used product that prevents initialization of polymerization of monomers.

Specific examples include, but are not limited to, potassium sorbate, sodium benzoate, sorbic acid, and chlorocresol.

Stabilizer

The stabilizer prevents polymerization of monomers during storage and includes, but are not limited to, anionic stabilizers and free radical stabilizers.

The anionic stabilizer includes, but is not limited to, metaphosphoric acid, maleic acid, maleic anhydride, alkylsulfonic acid, phosphorus pentoxide, iron (III) chloride, antimony oxide, 2,4,6-trinitrophenol, thiol, alkyl sulfonyl, alkylsulfone, alkyl sulfoxide, alkyl sulfites, sultones, sulfur dioxide, and sulfur trioxide.

The free radical stabilizer includes, but are not limited to, hydroquinone, catechol, and derivatives thereof.

Preparation of Foaming Agent Composition

The foaming agent composition for use in the present disclosure can be prepared by using the components mentioned above and the method and the condition for preparation are not particularly limited.

Foaming Inhibitor Composition Application and Foaming Inhibitor Composition Application Device The foaming inhibitor application is to apply a foaming inhibitor composition containing a foaming inhibitor to the foaming agent layer and executed by a foaming inhibitor composition application device.

The foaming inhibitor composition is applied in the foaming inhibitor composition application to a portion where the foaming agent layer is not to be swollen.

The foaming agent composition contains a multi-functional monomer as the foaming inhibitor, preferably a surface tension controlling agent, and optionally other components.

The same multi-functional monomers as for the foaming agent composition can be used. Specific examples include, but are not limited to, 1,6-hexanediol di(meth)acrylate, 1,3-butylene glycol di(meth)acrylate, 1,4-butanediol di(meth)acrylate, diethylene glycol di(meth)acrylate, neopentyl glycol di(meth)acrylate, and dipropylene glycol di(meth) acrylate. It is also possible to use a mixture of different types of multi-functional monomers, a mixture of a multi-functional monomer and a mono-functional monomer, a mixture of an oligomer having multiple functional groups and a mono-functional monomer, and a mixture of a multi-functional monomer, a mono-functional monomer, and an oligomer having multiple functional groups.

Multi-functional polymerizable compounds cross-link three-dimensionally by energy application due to a foaming inhibitor composition containing a foaming inhibitor as the multi-functional monomer. Foaming can be thus controller by applying the multi-functional polymerizable compound to an arbitrary portion in the foaming agent layer to apply energy, thereby imparting designing property to printed matter attributable to excellent rough surfaces.

Surface Tension Controlling Agent

The surface tension controlling agent is to control surface tension and is not particularly limited as long as it cures on radiation of active energy ray.

Specific examples include, but are not limited to, BYK-3550, BYK-3990, and BYK 35600 (all manufactured by BYK-Chemie GmbH).

The method of applying a foaming inhibitor composition is not particularly limited and can be suitably selected to suit to a particular application. Inkjet methods are preferable because the foaming inhibitor composition can be flexibly applied to various foaming patterns (or foaming inhibition patterns).

Methods of driving a discharging head for the inkjet method include, but are not limited to, a piezoelectric element actuator using PZT and others, a method of using a thermal energy, an on-demand type head using an actuator and others utilizing an electrostatic force, and a charge control type head employing a continuous spraying system.

The amount of the foaming inhibitor composition applied is not particularly limited and can be suitably selected to suit to a particular application. It is preferably from 0.014 to 2.8 µL/cm$^2$ to the surface area of the foaming agent layer.

Coloring Material Layer Forming and Coloring Material Layer Forming Device

The coloring material layer forming is to apply a coloring material composition containing a coloring material to form a coloring material layer and is executed by the coloring material layer forming device.

Coloring Material Composition

The coloring material composition contains a coloring material, preferably a polymerizable compound and a polymerization initiator, and optionally contains other components in terms of designing property due to .rough surface form and durability of image quality.

Coloring Material

Various pigments and dyes, which demonstrate black, white, magenta, cyan, yellow, green, orange, and gloss color such as gold and silver, can be used as the coloring material depending on the objectives and requisites of the coloring material composition of the present disclosure.

The proportion of the coloring material is not particularly limited and determined considering desired properties such as color density and dispersibility of the coloring material composition. The proportion of the coloring material in the total amount of the coloring material composition is preferably from 0.1 to 20 percent by mass and more preferably from 1 to 10 percent by mass.

As the pigment, an inorganic or organic pigment can be used alone or in combination.

Specific examples of the inorganic pigment include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, di oxane pigments, thioindigo pigments, isoindolinone pigments, and quinofuranone pigments, dye chelates such as basic dye type chelates and acid dye type chelates, dye lakes such as basic dye type lake and acid dye type lake, nitro pigments, nitroso pigments, aniline black, and daylight fluorescent pigments.

In addition, a dispersant is optionally added to enhance the dispersibility of a pigment.

The dispersant has no particular limit. For example, it is suitable to use a polymer dispersant conventionally used to prepare a pigment dispersion.

The dye includes, for example, an acidic dye, a direct dye, a reactive dye, a basic dye, and a combination thereof Polymerizable Compound The polymerizable compound is the same as that in the foaming agent composition in the foaming agent layer.

Polymerization Initiator

The polymerization initiator is the same as that in the foaming agent composition in the foaming agent layer.

Other Components

The other components are not particularly limited and can be suitably selected to suit to a particular application. Examples include, but are not limited to, organic solvents, surfactants, polymerization inhibitors, leveling agents, defoaming agents, fluorescent brighteners, penetration-enhancing agents, wetting agents (humectants), fixing agents, viscosity stabilizers, fungicide, preservatives, antioxidants, ultraviolet absorbents, chelate agents, pH regulator, and thickeners.

Organic Solvent

The coloring material composition for use in the present disclosure may contain an organic solvent, but if possible, it is preferred that the composition be free of an organic solvent. The composition free of an organic solvent, in particular a volatile organic compound (VOC), is preferable because it enhances safeness at which the composition is handled so that pollution of the environment can be prevented. The organic solvent represents a non-reactive organic solvent such as ether, ketone, xylene, ethylacetate, cyclohexanone, or toluene, which is clearly distinguished from a reactive monomer. Furthermore, "free of" an organic solvent means that no organic solvent is substantially included. The proportion thereof is preferably less than 0.1 percent by mass.

Preparation of Coloring Material Composition

The coloring material composition for use in the present disclosure can be prepared by using the components mentioned above. The preparation devices and conditions are not particularly limited. For example, the coloring material composition can be prepared by loading a pigment as coloring material, a dispersant, and others into a dispersing machine such as a ball mill, a kitty mill, a disk mill, a pin mill, and a DYNO-MILL to prepare a pigment liquid dispersion followed by mixing with a polymerizable compound, a polymerization initiator, a polymerization inhibitor, and a surfactant.

Viscosity

The viscosity of the coloring material composition for use in the present disclosure has no particular limit and it can be adjusted to suit to a particular application and device. For example, if a discharging device that discharges the composition from nozzles is used, the viscosity thereof is preferably in the range of from 3 to 40 mPa·s, more preferably from 5 to 15 mPa·s, and particularly preferably from 6 to 12 mPa·s in the temperature range of from 20 to 65 degrees C., preferably at 25 degrees C. In addition, it is particularly preferable to satisfy this viscosity range without containing the organic solvent mentioned above. Viscosity can be measured by a cone-and-plate type rotary viscometer (VISCOMETER TVE-22L, manufactured by TOKI SANGYO CO., LTD.) using a cone rotor (1° 34'×R24) at a rotational frequency of 50 rpm with a setting of the temperature of hemathermal circulating water in a range of from 20 to 65 degrees C. VISCOMATE VM-150III can be used for the temperature control of the circulating water.

The method of applying the coloring material composition to the foaming agent layer is not particularly limited and can be suitably selected to suit to a particular application. Inkjet methods are preferable in terms of productivity and flexibility to small lot production of many products.

Methods of driving a discharging head for the inkjet method include, but are not limited to, a piezoelectric element actuator using PZT and others, a method of using a thermal energy, an on-demand type head using an actuator and others utilizing an electrostatic force, and a charge control type head employing a continuous spraying system.

Curing and Curing Device

The foaming agent layer is cured upon irradiation of active energy by the curing device.

The foaming agent layer cures upon irradiation of active energy. When the coloring material layer contains a polymerizable compound, the coloring material layer cures upon irradiation of active energy. When the coloring material layer does not contain a polymerizable compound, the coloring material layer does not change upon irradiation of active energy. In the case of active energy, it is preferable to furthermore heat and expand the foaming agent layer.

Active Energy

Active energy is not particularly limited as long as they are able to apply energy necessary for allowing polymerization of polymerizable components in the composition. Examples of the active energy include, but are not limited to, electron beams, α-rays, β-rays, γ-rays, and X-rays, in addition to ultraviolet rays. Preferably, in another embodiment using a particularly high energy light source, it obviates the need for a polymerization initiator to proceed polymerization reaction. In addition, mercury-free is strongly preferable in the case of ultraviolet radiation in terms of protection of the environment and it is extremely useful to replace with a GaN-based semiconductor ultraviolet light-emitting device from industrial and environmental points of view. Furthermore, ultraviolet light-emitting diodes (UV-LED) and ultraviolet laser diodes (UV-LD) are preferable as ultraviolet light sources because they are small, inexpensive, and highly efficient, and have long working life.

There is no specific limitation to the curing condition and it can be suitably selected to suit to a particular application. In the case of ultraviolet, it is preferable to use an irradiator capable of emitting ultraviolet with an intensity of 6 W/cm at an irradiation distance of 2 mm.

If electron beams are used, it is preferable to apply an acceleration voltage to have a dose of 15 kGy or more at the farthermost point to cure from an electron beam irradiator.

Foaming and Foaming Device

Foaming is to heat the foaming agent layer to expand the volume thereof and is executed by a foaming device.

The foaming device is not particularly limited as long as it can expand the volume of the foaming agent in the foaming agent layer on heating and can be suitably selected to suit to a particular application.

Specific examples include, but are not limited to, an infrared heater, heated wind heater, and heating roller.

The heating temperature is not particularly limited as long as it is equal to or higher than the thermodecomposition temperature of a foaming agent and can be suitably selected to suit to a particular application. It is preferable from 100 to 200 degrees C.

Other Processes and Other Devices

The other optional processes are not particularly limited and can be suitably selected to suit to a particular application. Examples include, but are not limited to, an embossing process and control process.

The other optional devices are not particularly limited and can be suitably selected to suit to a particular application. Examples include, but are not limited to, an embossing processing device and a control device.

Embossing and Embossing Device

The embossing is to form a rough pattern to a foaming agent layer and coloring material layer and is executed by an embossing device.

The rough pattern can be formed by embossing, chemical embossing, rotary screening, or thermography to create roughness to materials such as wall paper and decorative board.

As the embossing device, it is possible to use a device to emboss a material with a cooling roller after heating or a device to emboss a material with a heating roller at once.

The depth of the embossing is preferably from 0.08 to 0.50 mm. When the depth of embossing is 0.08 mm or greater, it is possible to impart a three-dimensional effect. When the depth of embossing is 0.50 mm or less, it is possible to enhance wear resistance of a surface.

The rough pattern formed by embossing includes, but is not limited to, wood grain vessel channels, slate uneven surface, cloth surface texture, stain, pebbling, hair line, and parallel line grooves.

The printing device for use in the printing method of the present disclosure is described in detail with reference to the accompanying drawings.

Figure 3:
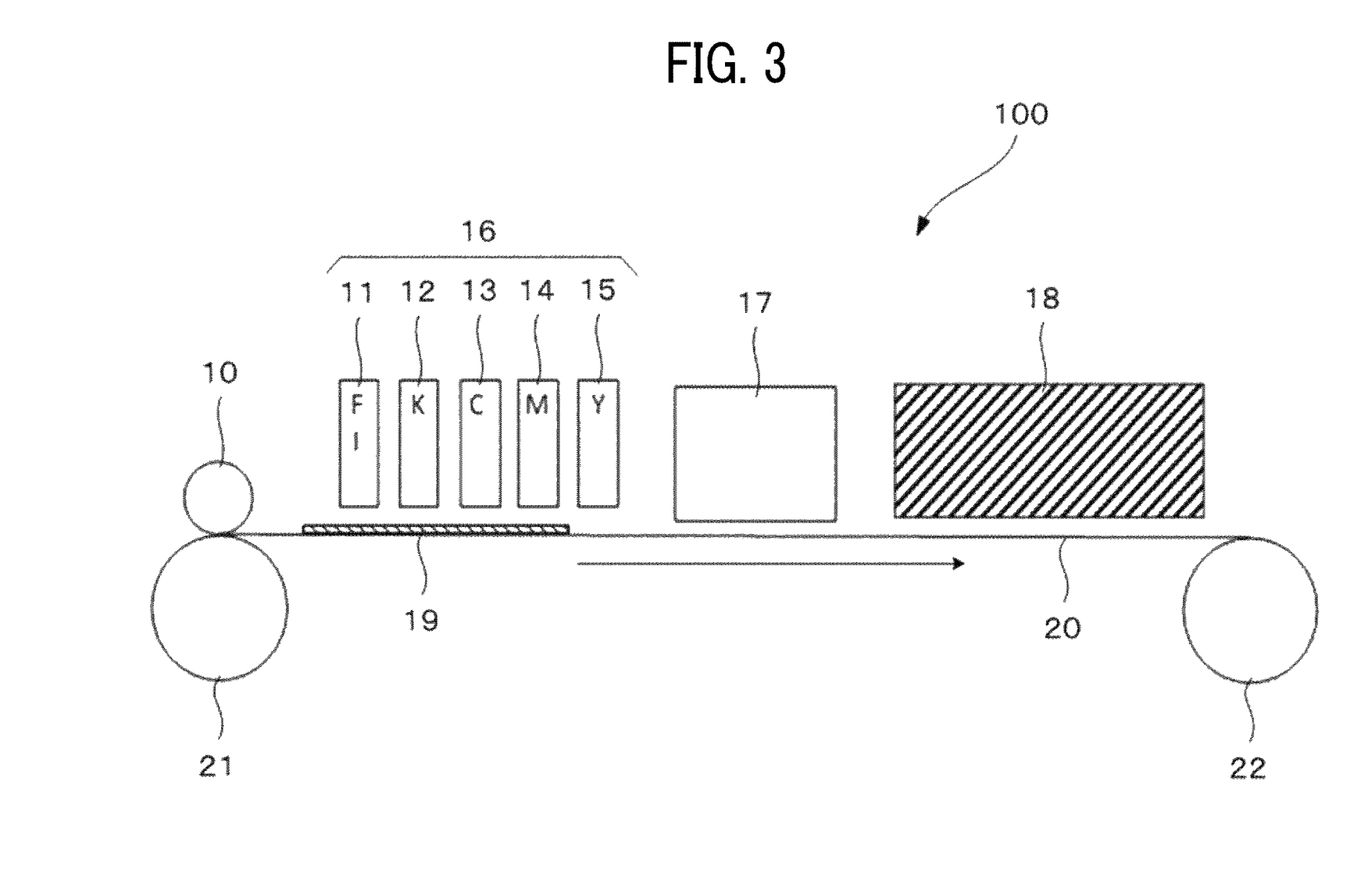
FIG. 3 is a schematic diagram illustrating an example of the printing device of the present disclosure for use in the printing method of the present disclosure.

FIG. 3 is a schematic diagram illustrating an example of the printing device of the present disclosure. A printing device 100 in FIG. 3 includes an application roller 10 that applies a foaming agent composition to a substrate 19, a discharging head 16 including a head 11 for foaming inhibitor composition, a head 12 for black, a head 13 for cyan, a head 14 for magenta, and a head 15 for yellow, an active energy ray irradiator 17, and a heating device 18, which are deposited downstream of the application roller 10. In FIG. 3, 20 represents a conveyor belt, 21, a feeding roller facing the application roller 10, and 22 represents a reeling roller.

The substrate 19 is conveyed in the direction indicated by the arrow in FIG. 3 while the reeling roller 22 reels the conveyor belt 20.

The application roller 10 applies a foaming agent composition to the surface of the substrate 19 to form a foaming agent layer.

The substrate 19 on which the foaming agent layer is formed is scanned at a predetermined speed and the head 11 for the foaming inhibitor composition discharges a foaming inhibitor composition to portions not to be expanded of the foaming agent layer. Thereafter, the head 12 for black, the head 13 for cyan, the head 14 for magenta, and the head 15 for yellow respectively discharge coloring material compositions for black, cyan, magenta, and yellow in inkjet method to form a coloring material layer.

The active energy ray irradiator 17 irradiates the foaming agent layer with active energy under predetermined conditions, so the foaming agent layer cures.

The heating device 18 heats the cured matter and the portion heated in the foaming agent layer foams. Printed matter is thus obtained which has designing property and image quality attributable to an excellent rough form.

The printed matter manufactured by the printing device of the present disclosure utilizing the printing method of the present disclosure has designing property and image quality attributable to an excellent rough form and maintains these properties for a long period of time. Accordingly, it can be suitably used for floor material, wall paper, interior material, wall board material, base board material, ceiling material, and pillar, and other materials.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

The viscosity of the foaming agent composition and the static surface tension of the foaming agent composition and the foaming inhibitor composition were measured as follows in the following Examples.

Measuring Viscosity

The viscosity of the foaming agent composition was measured by a cone plate type rotatory viscometer (VISCOMETER TVE-22L, manufactured by TOKI SANGYO CO., LTD.) using a cone rotor (1° 34'×R24) at a rate of rotation at 50 rpm and hemathermal circulating water at 25 degrees C.

Measuring Static Surface Tension

The static surface tension of the foaming agent composition and the foaming inhibitor composition was measured by a plate method using an automatic surface tensiometer DY-300 (manufactured by Kyowa Interface Science, Inc.) using a platinum plate (width of 23.85 mm and thickness of 0.15 mm)(manufactured by Kyowa Interface Science, Inc.). The temperature of the measuring object was adjusted to 25 degrees C. by using a heated and cooled water circulating system 4VT (manufactured by Kyowa Interface Science, Inc.) whose rate of stage was set to 0.2 mm/s.

Example 1

FIG. 3 is a schematic diagram illustrating an example of the printing device of the present disclosure used in Example 1. A printing device 100 in FIG. 3 includes an application roller 10 that applies a foaming agent composition to a substrate 19, a discharging head 16 including a head 11 for foaming inhibitor composition, a head 12 for black, a head 13 for cyan, a head 14 for magenta, and a head 15 for yellow, an active energy ray irradiator 17, and a heating device 18, which are deposited downstream of the application roller 10. In FIG. 3, 20 represents a conveyor belt, 21, a feeding roller facing the application roller 10, and 22 represents a reeling roller. The substrate 19 is conveyed in the direction indicated by the arrow in FIG. 3 while the reeling roller 22 reels the conveyor belt 20.

A GEN4 head (MH2420, manufactured by Ricoh Co., Ltd.) was used as the discharging head 16. Each five of the head 11 for foaming inhibitor composition, the head 12 for black, the head 13 for cyan, the head 14 for magenta, and the head 15 for yellow were arranged in parallel. The discharging head 16 was heated to 45 degrees C. and the frequency was adjusted, which enabled drawing with a droplet size of 20 pL An EC 300/30/30 mA (manufactured by Iwasaki Electric Co., Ltd.) including an inert gas blanket was used as the active energy ray irradiator 17, to which an $N_2$ gas generator (Maxi-Flow 30, manufactured by In House Gas Ltd.) with an external compressor was connected at a pressure of 0.2 Mpa·s. An $N_2$ flow rate was set to from 2 to 10 L/minute so that an oxygen density was 500 ppm or less.

A heater combined of Vortex blower G series (manufactured by Hitachi Industrial Equipment Systems Co., Ltd.), an electric heater XS-2 for generating hot-air (manufactured by Kansai Electric Heat Corp.), and a high-blow nozzle 50AL type (manufactured by Kansai Electric Heat Corp.) was adjusted to have a wind speed of 30 m/s from the tip of the nozzle and used as the heating device 18.

The following foaming agent composition was applied to the surface of paper (High grade plane paper RJPH-03, manufactured by OSTRICHDIA CO., LTD.) having a mass of 80 g/m² by the application roller 10 to form a foaming agent layer having an average thickness of 100 μm. This material was used as the substrate 19.

The substrate 19 on which the foaming agent layer was formed was scanned at a speed of 15 m/minute and the head 11 for the foaming inhibitor composition discharged the following foaming inhibitor composition to portions not to be expanded of the foaming agent layer. Thereafter, the head 12 for black, the head 13 for cyan, the head 14 for magenta, and the head 15 for yellow respectively discharged the following coloring material compositions for black, cyan, magenta, and yellow in an inkjet method to form a coloring material layer covering 25 percent of each color film (a fourth width of each color film).

The active energy ray irradiator 17 irradiated the foaming agent layer and the coloring material layer with active energy under the irradiation conditions of an accelerating voltage of 30 kV and a dose of 30 kGy, thereby curing the layers.

The heating device 18 heated the cured matter thus obtained at 170 degrees C. for 10 seconds and the heated portion of the foaming agent layer expanded. Printed matter of Example 1 was thus obtained.

Foaming Agent Composition

To a polymerizable compound formed of 90 parts of isobornyl acrylate (manufactured by TOMOE Engineering Co., Ltd.) and 10 parts of trimethylol propane triacrylate (manufactured by TOMOE Engineering Co., Ltd.) at 94 percent by mass, a foaming agent (azodicarboxylic acid amide, manufactured by EIWA CHEMICAL IND. CO., LTD.) at 3 percent by mass and a foaming accelerating agent (zinc naphthenate, manufactured by Tokyo Chemical Industry Co. Ltd.) at 3 percent by mass were added followed by stirring to prepare a foaming agent composition.

Foaming Inhibitor Composition

A multi-functional monomer (1,6-hexanediol diacrylate, SR238, manufactured by Sartomer Co., Ltd.) was used to form a foaming inhibitor composition.

Preparation of Coloring Material Composition for Black

A total of 60 parts of acryloylmorpholine (manufactured by Tokyo Chemical Industry Co. Ltd.), 20 parts by mass of benzyl acrylate (manufactured by Tokyo Chemical Industry Co. Ltd.), and 40 parts of SPECIAL BLACK 250 (black pigment, manufactured by BASF Japan Ltd.) as a coloring material were stirred to prepare a coloring material composition for black.

Preparation of Coloring Material Composition for Cyan

A total of 60 parts of acryloylmorpholine (manufactured by Tokyo Chemical Industry Co. Ltd.), 20 parts by mass of benzyl acrylate (manufactured by Tokyo Chemical Industry Co. Ltd.), and 40 parts of a coloring material (IRGALITE BLUE GLVO, cyan pigment, manufactured by BASF Japan Ltd.) were stirred to prepare a coloring material composition for cyan.

Preparation of Coloring Material Composition for Magenta

A total of 60 parts of acryloylmorpholine (manufactured by Tokyo Chemical Industry Co. Ltd.), 20 parts by mass of benzyl acrylate (manufactured by Tokyo Chemical Industry Co. Ltd.), and 40 parts of CINQUASIA MAGENTA RT-355-D (magenta pigment, manufactured by BASF Japan Ltd.) as a coloring material were stirred to prepare a coloring material composition for magenta.

Preparation of Coloring Material Composition for Yellow

A total of 60 parts of acryloylmorpholine (manufactured by Tokyo Chemical Industry Co. Ltd.), 20 parts by mass of benzyl acrylate (manufactured by Tokyo Chemical Industry Co. Ltd.), and 40 parts of NOVOPERM YELLOW H2G (yellow pigment, manufactured by Clariant AG) as a coloring material were stirred to prepare a coloring material composition for yellow.

The viscosity of the foaming agent composition of Example 1 was 126 mPa·s at 25 degrees C., the static surface tension thereof was 32.9 mN/m. The static surface tension of the foaming inhibitor composition was 35.7 mN/m. The absolute difference of the static surface tension between the foaming agent composition and the foaming inhibitor composition is 2.8 mN/m.

Example 2

Printed matter of Example 2 was obtained in the same manner as in Example 1 except that the following foaming agent composition and foaming inhibitor composition were used.

Foaming Agent Composition

To a polymerizable compound formed of 50 parts of isobornyl acrylate (manufactured by TOMOE Engineering Co., Ltd.) and 50 parts of 2-acryloyloxy propyl phthalic acid (ACB-21, manufactured by TOMOE Engineering Co., Ltd.) at 94 percent by mass, a foaming agent (azodicarboxylic acid amide, manufactured by EIWA CHEMICAL IND. CO., LTD.) at 3 percent by mass and a foaming accelerating agent (zinc naphthenate, manufactured by Tokyo Chemical Industry Co. Ltd.) at 3 percent by mass were added followed by stirring to prepare a foaming agent composition.

Foaming Inhibitor Composition

A multi-functional monomer (neopentyl diacrylate. SR247, manufactured by Sartomer Co., Ltd.) was used to form a foaming inhibitor composition.

The viscosity of the foaming agent composition of Example 2 was 126 mPa·s at 25 degrees C., the static surface tension thereof was 32.9 mN/m. The static surface tension of the foaming inhibitor composition was 32.85 mN/m. The absolute difference of the static surface tension between the foaming agent composition and the foaming inhibitor composition is 0.1 mN/m.

Example 3

Printed matter of Example 3 was obtained in the same manner as in Example 1 except that the foaming inhibitor composition was replaced with the following.

Foaming Inhibitor Composition

A total of 0.01 parts of a surface tension controlling agent (UV3510, manufactured by BYK-Chemie GmbH) was admixed with 100 parts of a multi-functional monomer of 1,6-hexane diol diacrylate to prepare a foaming inhibitor composition.

The viscosity of the foaming agent composition of Example 3 was 126 mPa·s at 25 degrees C., the static surface tension thereof was 32.9 mN/m. The static surface tension of the foaming inhibitor composition was 33.5 mN/m. The absolute difference of the static surface tension between the foaming agent composition and the foaming inhibitor composition is 0.6 mN/m.

Example 4

Printed matter of Example 4 was obtained in the same manner as in Example 1 except that the foaming inhibitor composition was replaced with the following.

Foaming Inhibitor Composition

A total of 0.15 parts of a surface tension controlling agent (UV3510, manufactured by BYK-Chemie GmbH) was admixed with 100 parts of a multi-functional monomer of 1,6-hexane diol diacrylate to prepare a foaming inhibitor composition.

The viscosity of the foaming agent composition of Example 4 was 126 mPa·s at 25 degrees C., the static surface tension thereof was 32.9 mN/m. The static surface tension of the foaming inhibitor composition was 30.0 mN/m. The absolute difference of the static surface tension between the foaming agent composition and the foaming inhibitor composition is 2.9 mN/m.

Example 5

Printed matter of Example 5 was obtained in the same manner as in Example 1 except that the foaming inhibitor composition was replaced with the following.

Foaming Inhibitor Composition

A multi-functional monomer (1,3-butylene glycol diacrylate, SR212, manufactured by Sartomer Company) was used to form a foaming inhibitor composition.

The viscosity of the foaming agent composition of Example 5 was 126 mPa·s at 25 degrees C., the static surface tension thereof was 32.9 mN/m. The static surface tension of the foaming inhibitor composition was 33.6 mN/m. The absolute difference of the static surface tension between the foaming agent composition and the foaming inhibitor composition is 0.7 mN/m.

Example 6

Printed matter of Example 6 was obtained in the same manner as in Example 1 except that the following foaming agent composition and foaming inhibitor composition were used.

Foaming Agent Composition

To a composition formed of 50 parts of isobornyl acrylate (manufactured by TOMOE Engineering Co., Ltd.) and 50 parts of 2-acryloyloxy propyl phthalic acid (ACB-21, manufactured by Shin-Nakamura Chemical Co., Ltd.) at 93.9 percent by mass, a foaming agent (azodicarboxylic acid amide, manufactured by EIWA CHEMICAL IND. CO., LTD.) at 3 percent by mass, a foaming accelerating agent (zinc naphthenate, manufactured by Tokyo Chemical Industry Co. Ltd.) at 3 percent by mass, and 0.1 parts of a surface tension controlling agent (UV3570, manufactured by BYK-Chemie GmbH) were added followed by stirring to prepare a foaming agent composition.

Foaming Inhibitor Composition

A total of 0.15 parts of UV3510 (manufactured by BYK-Chemie GmbH) as a surface tension controlling agent was admixed with 100 parts of a multi-functional monomer of 1,6-hexane diol diacrylate to prepare a foaming inhibitor composition.

The viscosity of the foaming agent composition of Example 6 was 126 mPa·s at 25 degrees C., the static surface tension thereof was 30 mN/m. The static surface tension of the foaming inhibitor composition was 30 mN/m. The absolute difference of the static surface tension between the foaming agent composition and the foaming inhibitor composition is 0 mN/m.

Example 7

Printed matter of Example 7 was obtained in the same manner as in Example 1 except that the foaming agent composition was replaced with the following.

Foaming Agent Composition

A total of 50 parts of isobornyl acrylate (manufactured by TOMOE Engineering Co., Ltd.), 50 parts of 2-acryloyloxy propyl phthalic acid (ACB-21, manufactured by Shin-Nakamura Chemical Co., Ltd.), and 2 parts of KUREHA microsphere (H750, manufactured by KUREHA CORPORATION) were added followed by stirring to prepare a foaming agent composition.

The viscosity of the foaming agent composition of Example 7 was 126 mPa·s at 25 degrees C., the static surface tension thereof was 32.9 mN/m. The static surface tension of the foaming inhibitor composition was 35.7 mN/m. The absolute difference of the static surface tension between the foaming agent composition and the foaming inhibitor composition is 2.8 mN/m.

Figure 4:
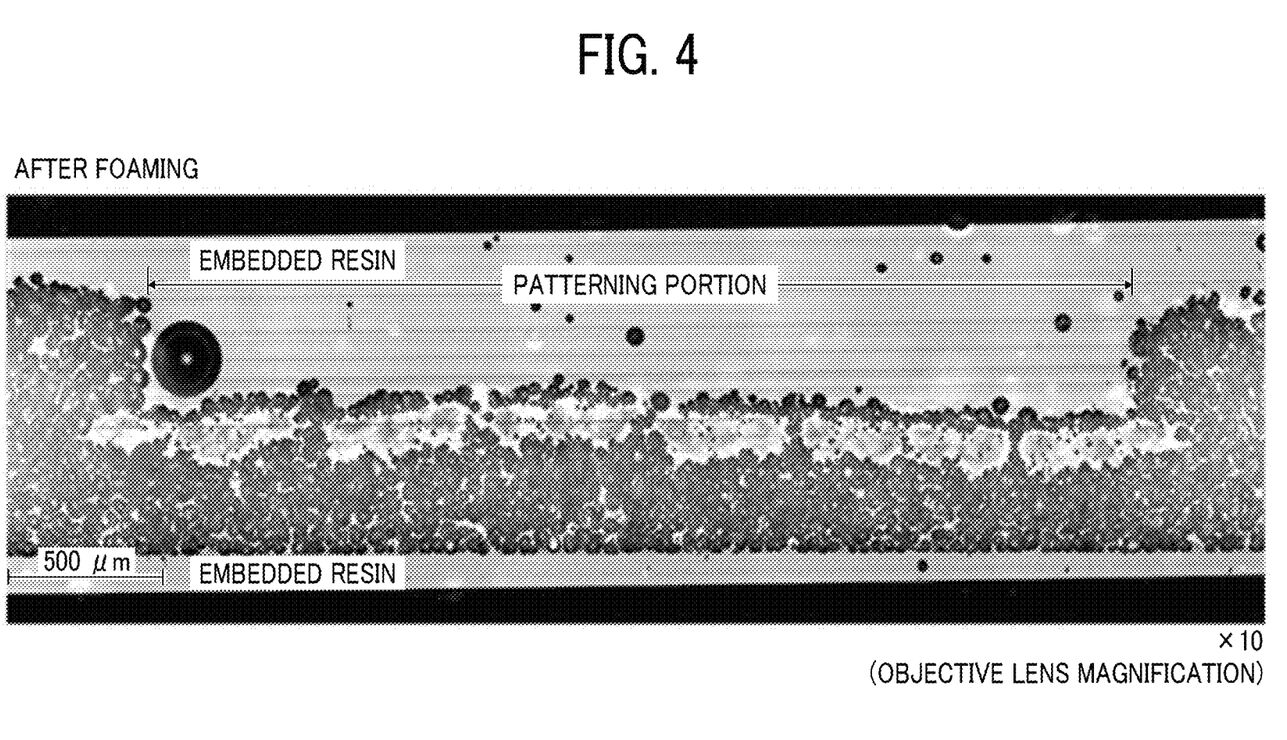
FIG. 4 is a photograph of the cross section after foaming of printed matter produced in Example 7, which is described later.

FIG. 4 is a photograph of the cross section after foaming of printed matter produced in Example 7. As seen in FIG. 4, the foaming inhibitor permeated from the surface of the foaming agent layer to the inside. that is, volume expansion was inhibited.

Example 8

Printed matter of Example 8 was obtained in the same manner as in Example 1 except that the foaming agent composition was replaced with the following.

Foaming Agent Composition

To a polymerizable compound formed of 50 parts of 2-acryloyloxy ethyl succinic acid (A-SA, manufactured by Shin-Nakamura Chemical Co., Ltd.) and 50 parts of 2-acryloyloxy propyl phthalic acid (ACB-21, manufactured by Shin-Nakamura Chemical Co., Ltd.) at 94 percent by mass, a foaming agent (azodicarboxylic acid amide, manufactured by EIWA CHEMICAL IND. CO., LTD.) at 3 percent by mass and a foaming accelerating agent (zinc naphthenate, manufactured by Tokyo Chemical Industry Co. Ltd.) at 3 percent by mass were added followed by stirring to prepare a foaming agent composition.

The viscosity of the foaming agent composition of Example 8 was 771 mPa·s at 25 degrees C., the static surface tension thereof was 33.5 mN/m. The static surface tension of the foaming inhibitor composition was 35.7 mN/m. The absolute difference of the static surface tension between the foaming agent composition and the foaming inhibitor composition is 2.2 mN/m.

Example 9

Printed matter of Example 9 was obtained in the same manner as in Example 1 except that the foaming agent composition was replaced with the following.

Foaming Agent Composition

To a polymerizable compound formed of 33 parts of 2-acryloyloxy ethyl succinic acid (A-SA, manufactured by Shin-Nakamura Chemical Co., Ltd.) and 67 parts of 2-acryloyloxy propyl phthalic acid (ACB-21, manufactured by Shin-Nakamura Chemical Co., Ltd.) at 94 percent by mass, a foaming agent (azodicarboxylic acid amide, manufactured by EIWA CHEMICAL IND. CO., LTD.) at 3 percent by mass and a foaming accelerating agent (zinc naphthenate, manufactured by Tokyo Chemical Industry Co. Ltd.) at 3 percent by mass were added followed by stirring to prepare a foaming agent composition.

The viscosity of the foaming agent composition of Example 9 was 196 mPa·s at 25 degrees C., the static surface tension thereof was 33.9 mN/m. The static surface tension of the foaming inhibitor composition was 35.7 mN/m. The absolute difference of the static surface tension between the foaming agent composition and the foaming inhibitor composition is 1.6 mN/m.

Comparative Example 1

Printed matter of Comparative Example 1 was obtained in the same manner as in Example 7 except that the foaming agent composition was replaced with the following.

Foaming Agent Composition

To a composition formed of 90 parts of isobornyl acrylate (manufactured by TOMOE Engineering Co., Ltd.) and 10 parts of trimethylol propane triacrylate (manufactured by TOMOE Engineering Co., Ltd.) at 93 percent by mass, a foaming agent (KUREHA microsphere H750, manufactured by KUREHA CORPORATION) at 2 percent by mass and a foaming accelerating agent (UV3510, manufactured by BYK-Chemie GmbH) at 1 percent by mass were added followed by stirring to prepare a foaming agent composition.

The viscosity of the foaming agent composition of Comparative Example 1 was 40 mPa·s at 25 degrees C., the static surface tension thereof was 25.7 mN/m. The static surface tension of the foaming inhibitor composition was 35.7 mN/m. The absolute difference of the static surface tension between the foaming agent composition and the foaming inhibitor composition is 10 mN/m.

Figure 5:
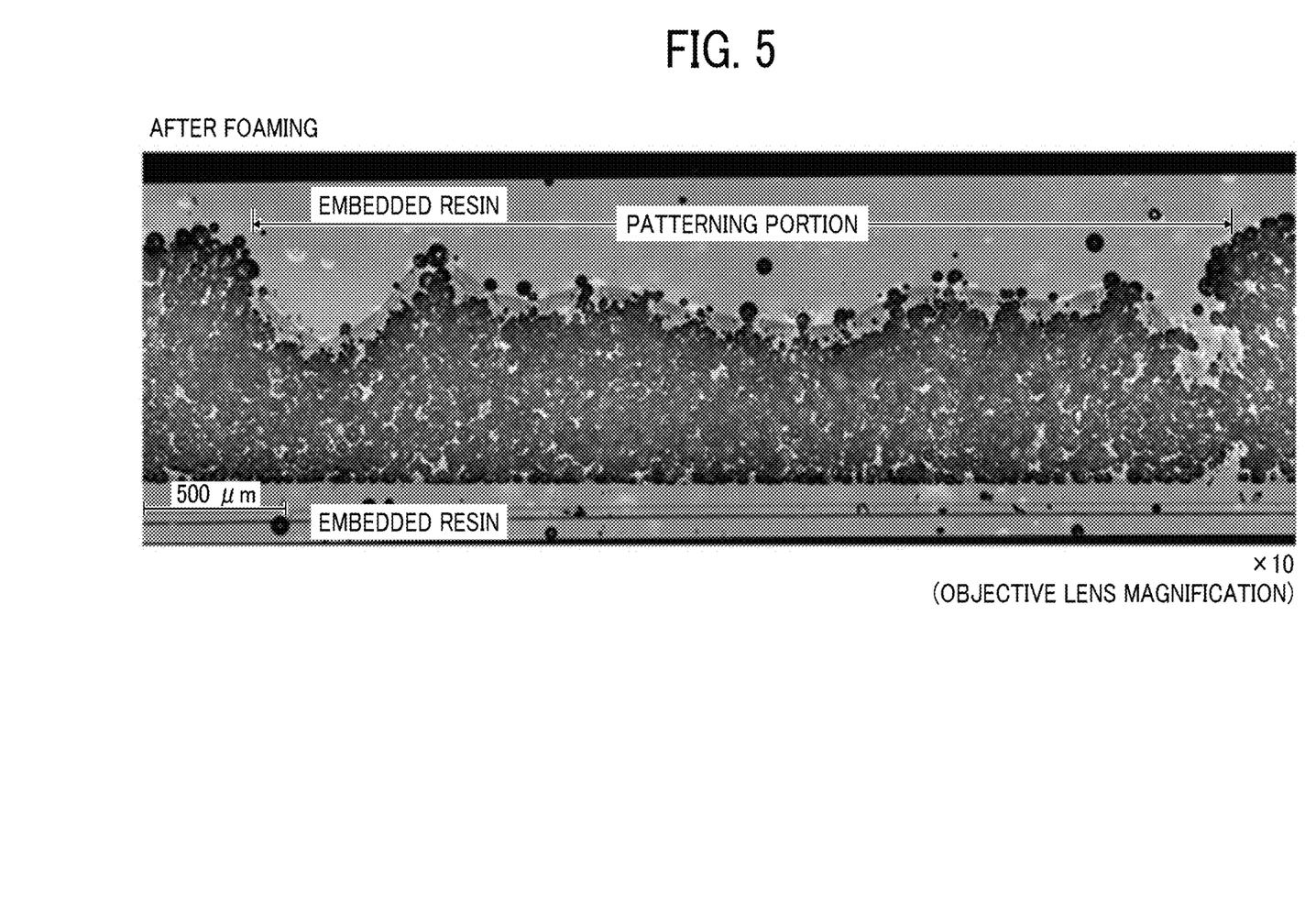
FIG. 5 is a photograph of the cross section after foaming of printed matter produced in Comparative Example 1, which is described later.

FIG. 5 is a photograph of the cross section after foaming of printed matter produced in Comparative Example 1. As seen in FIG. 5, the foaming inhibitor did not permeate to the inside of the foaming agent layer and accumulates around the surface, that is, volume expansion was not controlled, which resulted in forming an uneven surface.

Comparative Example 2

Printed matter of Comparative Example 2 was obtained in the same manner as in Example 7 except that the foaming agent composition was replaced with the following.

Foaming Agent Composition

To a composition formed of 90 parts of isobornyl acrylate (manufactured by TOMOE Engineering Co., Ltd.) and 10 parts of trimethylol propane triacrylate (manufactured by TOMOE Engineering Co., Ltd.) at 93.9 percent by mass, 2 parts of a foaming agent (KUREHA microsphere H750, manufactured by KUREHA CORPORATION) and a surface tension controlling agent (UV3510, manufactured by BYK-Chemie GmbH) at 0.1 percent by mass were added followed by stirring to prepare a foaming agent composition.

The viscosity of the foaming agent composition of Comparative Example 2 was 39 mPa·s at 25 degrees C., the static surface tension thereof was 30.7 mN/m. The static surface tension of the foaming inhibitor composition was 35.7 mN/m. The absolute difference of the static surface tension between the foaming agent composition and the foaming inhibitor composition is 5 mN/m.

Comparative Example 3

Printed matter of Comparative Example 3 was obtained in the same manner as in Example 1 except that the foaming agent composition was replaced with the following.

Foaming Agent Composition

To a polymerizable compound formed of 67 parts of isobornyl acrylate (manufactured by TOMOE Engineering Co., Ltd.) and 33 parts of trimethylol propane triacrylate (manufactured by TOMOE Engineering Co., Ltd.) at 94 percent by mass, a foaming agent (azodicarboxylic acid amide, manufactured by EIWA CHEMICAL IND. CO., LTD.) at 3 percent by mass and a foaming accelerating agent (zinc naphthenate, manufactured by Tokyo Chemical Industry Co. Ltd.) at 3 percent by mass were added followed by stirring to prepare a foaming agent composition.

The viscosity of the foaming agent composition of Comparative Example 3 was 3,350 mPa·s at 25 degrees C., the static surface tension thereof was 33.8 mN/m. The static surface tension of the foaming inhibitor composition was 35.7 mN/m. The absolute difference of the static surface tension between the foaming agent composition and the foaming inhibitor composition is 1.9 mN/m.

Figure 6:
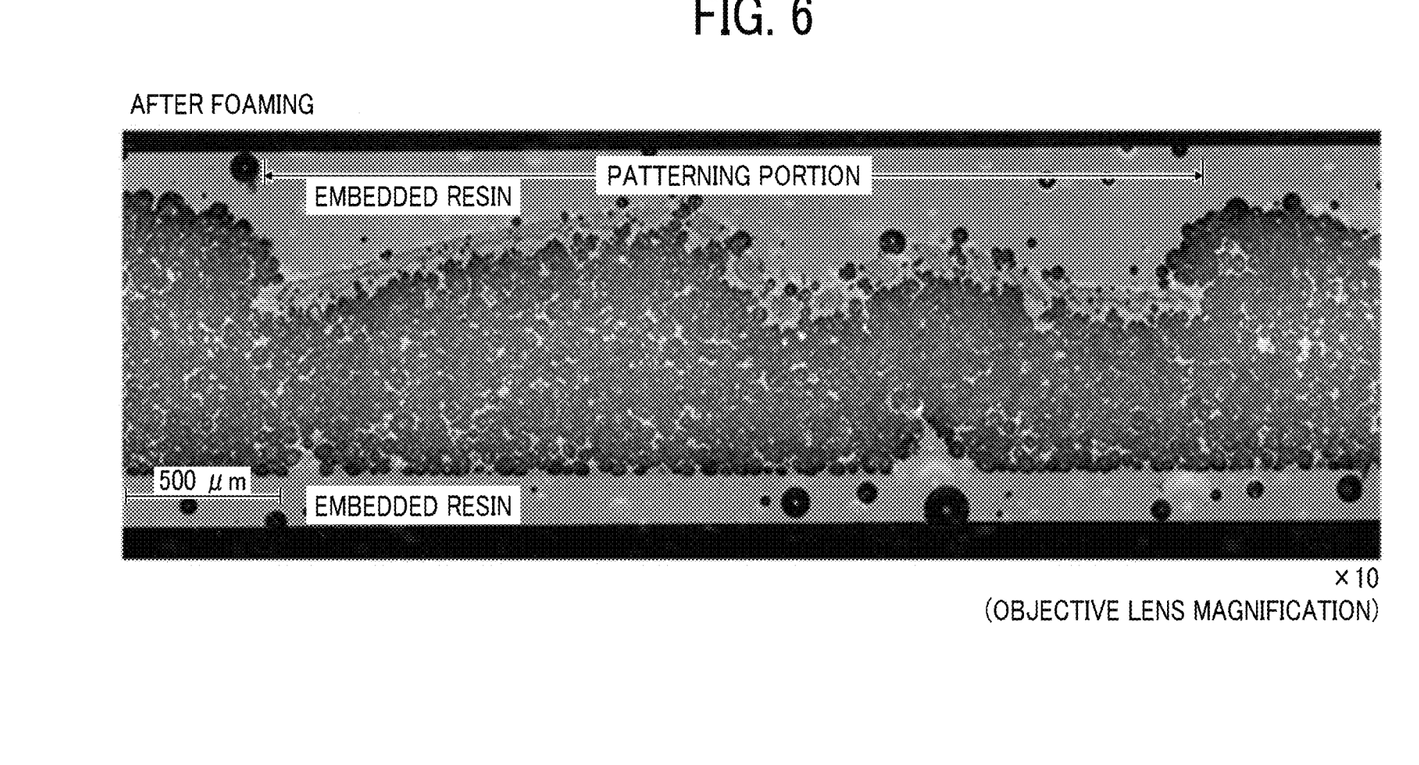
FIG. 6 is a photograph of the cross section after foaming of printed matter produced in Comparative Example 3, which is described later.

FIG. 6 is a photograph of the cross section after foaming of printed matter produced in Comparative Example 3. As seen in FIG. 6, the foaming inhibitor did not permeate to the inside of the foaming agent layer and accumulates around the surface, that is, volume expansion was not controlled, which resulted in forming an uneven surface.

Each printed matter of Examples 1 to 9 and Comparative Examples 1 to 3 was evaluated on designing property attributable to rough surface and designing property attributable to rough surface and durability of image as follows. The results are shown in Tables 1 to 3.

Designing Property Attributable to Rough Surface

The surface of the printed matter thus obtained was visually observed and touched by finger to evaluate the level of the designing property attributable to rough surface to the application pattern of the foaming inhibitor composition according to the following criteria. C and higher grades are allowable for practical purpose.

Evaluation Criteria

A: The application pattern of the foaming inhibitor composition matches the rough surface and the step of the surface was clearly present B: The application pattern of the foaming inhibitor composition matches the rough surface and the step of the surface was present C: The rough form to the application pattern of the foaming inhibitor composition was not clearly present but felt by finger touch D. The rough form to the application pattern of the foaming inhibitor composition was not clearly present nor felt by finger touch Evaluation Method of Designing Property Attributable to Rough Form and Durability of Image The surface of the printed matter was damaged with a cutter and acetone was sprayed. The material obtained was left undone for 12 hours, the surface of the printed matter was rubbed 10 times, and the rubbed image portion and the degree of volume expansion were observed visually and with a microscope to evaluate the designing property attributable to rough surface and durability of image quality.

Evaluation Criteria

A: Extremely good level. No blurring at image portion or peeling of foaming agent layer from substrate.

B: Good level. Little blurring at image portion or peeling of foaming agent layer from substrate.

TABLE 1

| | Example | | | | |
|---|---|---|---|---|---|
| | 1 | 2 | 3 | 4 | 5 |
| Viscosity of foaming agent composition at 25 degrees C. (mPa · s) | 126 | 126 | 126 | 126 | 126 |
| Static surface tension difference (mN/m) | 2.8 | 0.1 | 0.6 | 2.9 | 0.7 |
| Designing property attributable to rough surface | A | C | B | A | B |
| Designing property attributable to rough form and durability of image | B | B | B | B | B |

TABLE 2

| | Example | | | |
|---|---|---|---|---|
| | 6 | 7 | 8 | 9 |
| Viscosity of foaming agent composition at 25 degrees C. (mPa · s)8 | 126 | 126 | 771 | 196 |
| Static surface9 tension difference (mN/m) | 0 | 2.8 | 2.2 | 1.6 |
| Designing property attributable to rough surface | B | B | B | B |
| Designing property attributable to rough form and durability of image | B | B | B | B |

TABLE 3

| | Comparative Example | | |
|---|---|---|---|
| | 1 | 2 | 3 |
| Viscosity of foaming agent composition at 25 degrees C. (mPa · s) | 40 | 39 | 3350 |
| Static surface9 tension difference (mN/m) | 10 | 5 | 1.9 |

TABLE 3-continued

| | Comparative Example | | |
|---|---|---|---|
| | 1 | 2 | 3 |
| Designing property attributable to rough surface | D | D | |
| Designing property attributable to rough form and durability of image | A | A | A |

Aspects of the present disclosure are, for example, as follows.

1. A printing method includes applying a foaming agent composition containing a foaming agent to form a foaming agent layer, applying a foaming inhibitor composition containing a foaming inhibitor onto the foaming agent layer, curing the foaming agent layer with irradiation of an active energy, and heating the foaming agent layer to foam the foaming agent layer, wherein the foaming agent composition has a viscosity of from 50 to 1,500 mPa·s at 25 degrees C. and the absolute difference between the static surface tension of the foaming agent composition and the static surface tension of the foaming inhibitor composition is 5 mN/m or less.
2. The printing method according to 1 mentioned above, wherein the foaming agent contains a chemical blowing agent or a thermofoaming microcapsule.
3. The printing method according to 1 or 2 mentioned above, wherein the foaming inhibitor contains a multi-functional monomer.
4. The printing method according to any one of 1 to 3 mentioned above, wherein the foaming inhibitor composition is applied by an inkjet method.
5. The printing method according to any one of 1 to 4 mentioned above, wherein the foaming inhibitor composition further contains an active energy curing material.
6. The printing method according to any one of 1 to 5 mentioned above, wherein the foaming agent composition and the foaming inhibitor composition further contain a surface tension controlling agent.
7. The printing method according to 6 mentioned above, wherein the surface tension controlling agent in the foaming agent composition is non-reactive to active energy.
8. The printing method according to 6 mentioned above, wherein the surface tension controlling agent in the foaming inhibitor composition contains an active energy curing material.
9. The printing method according to any one of 1 to 8 mentioned above, further includes applying a coloring material composition containing a coloring material to form a coloring material layer.
10. The printing method according to 9 mentioned above, wherein the coloring material composition further contains an active energy curing material.
11. The printing method according to 9 or 10 mentioned above, further includes irradiating the coloring material layer with active energy to cure the coloring material layer.
12. A printing device includes a foaming agent layer forming device configured to apply a foaming agent composition containing a foaming agent to form a foaming agent layer, a foaming inhibitor composition applying device configured to apply a foaming inhibitor composition containing a foaming inhibitor to the foaming agent layer, a curing device configured to irradiate the foaming agent layer with active energy, and a foaming device configured to heat and foam the foaming agent layer, wherein the foaming agent composition has a viscosity of from 50 to 1,500 mPa·s at 25 degrees C. and the absolute difference between the static surface tension of the foaming agent composition and the static surface tension of the foaming inhibitor composition is 5 mN/m or less.
13. The printing device according to 12 mentioned above, wherein the foaming agent contains a chemical blowing agent or a thermofoaming microcapsule.
14. The printing device according to 12 or 13 mentioned above, wherein the foaming inhibitor contains a multi-functional monomer.
15. The printing device according to any one of 12 to 14 mentioned above, wherein the foaming inhibitor composition is applied by an inkjet method.
16. The printing device according to any one of 12 to 15 mentioned above, wherein the foaming inhibitor composition further contains an active energy curing material.
17. The printing device according to any one of 12 to 16 mentioned above, wherein the foaming agent composition and the foaming inhibitor composition further contains a surface tension controlling agent.
18. The printing device according to 17 mentioned above, wherein the surface tension controlling agent in the foaming agent composition is non-reactive to active energy.
19. The printing device according to 17 mentioned above, wherein the surface tension controlling agent in the foaming agent composition is non-reactive to active energy.
20. The printing device according to any one of 12 to 19 mentioned above further includes a coloring material layer forming device to apply a coloring material composition containing a coloring material.
21. The printing device according to 20 mentioned above, wherein the coloring material composition further contains an active energy curing material.
22. The printing device according to 12 to 21 mentioned above, further includes a coloring material layer curing device to cure the coloring material layer.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:
1. A printing method comprising:
applying a foaming agent composition containing a foaming agent to form a foaming agent layer;
applying a foaming inhibitor composition containing a foaming inhibitor onto the foaming agent layer;

curing the foaming agent layer with irradiation of active energy; and heating the foaming agent layer to foam the foaming agent layer, wherein the foaming agent composition has a viscosity of from 50 to 1,500 mPa·s at 25 degrees C., wherein an absolute difference between a static surface tension of the foaming agent composition and a static surface tension of the foaming inhibitor composition is 5 mN/m or less.

2. The printing method according to claim 1, wherein the foaming agent comprises a chemical blowing agent or a thermofoaming microcapsule.

3. The printing method according to claim 1, wherein the foaming inhibitor comprises a multi-functional monomer.

4. The printing method according to claim 1, wherein the foaming inhibitor composition is applied by an inkjet method.

5. The printing method according to claim 1, wherein the foaming inhibitor composition further contains an active energy curing material.

6. The printing method according to claim 1, wherein the foaming agent composition and the foaming inhibitor composition further comprise a surface tension controlling agent.

7. The printing method according to claim 6, wherein the surface tension controlling agent in the foaming agent composition is non-reactive to active energy.

8. The printing method according to claim 6, wherein the surface tension controlling agent in the foaming inhibitor composition comprises an active energy curing material.

9. The printing method according to claim 1, further comprising applying a coloring material composition comprising a coloring material to form a coloring material layer.

10. The printing method according to claim 9, wherein the coloring material composition further contains an active energy curing material.

11. The printing method according to claim 9, further comprising irradiating the coloring material layer with active energy to cure the coloring material layer.

12. A printing device comprising:

a foaming agent layer forming device configured to apply a foaming agent composition containing a foaming agent to form a foaming agent layer;

a foaming inhibitor composition applying device configured to apply a foaming inhibitor composition containing a foaming inhibitor onto the foaming agent layer;

a curing device configured to irradiate the foaming agent layer with active energy; and a foaming device configured to heat and foam the foaming agent layer, wherein the foaming agent composition has a viscosity of from 50 to 1,500 mPa·s at 25 degrees C., wherein an absolute difference between a static surface tension of the foaming agent composition and a static surface tension of the foaming inhibitor composition is 5 mN/m or less.

* * * * *